United States Patent [19]
Shijo et al.

[11] Patent Number: 6,032,375
[45] Date of Patent: Mar. 7, 2000

[54] INCLINATION SENSOR

[75] Inventors: Yoshihisa Shijo; Masahide Inoue; Takanobu Shiokawa; Hiroshi Sone, all of Tokyo, Japan

[73] Assignee: Asahi Kogaku Kogyo Kabushiki Kaisha, Tokyo, Japan

[21] Appl. No.: 08/840,074

[22] Filed: Apr. 24, 1997

[30] Foreign Application Priority Data

Apr. 25, 1996 [JP] Japan .................................. 8-105834

[51] Int. Cl.⁷ .................................................. G01C 9/06
[52] U.S. Cl. ........................................................ 33/366.21
[58] Field of Search ........................... 33/366.11, 366.12, 33/366.17, 366.21, 366.15

[56] References Cited

U.S. PATENT DOCUMENTS

| | | | |
|---|---|---|---|
| 2,713,726 | 6/1955 | Dixson | 33/366.12 |
| 2,713,727 | 7/1955 | Balsam | 33/366.21 |
| 4,583,296 | 4/1986 | Dell'Acqua | 33/366.12 |
| 5,180,986 | 1/1993 | Swartz et al. | 33/366.12 |

FOREIGN PATENT DOCUMENTS 7146142  6/1995  Japan .

*Primary Examiner*—Bernard Roskoski
*Attorney, Agent, or Firm*—Greenblum & Bernstein, P.L.C.

[57] ABSTRACT

An inclination sensor includes a container in which an electrolyte liquid and a gas bubble are sealed. The container has a top member with a concave surface having a radius of curvature in a first direction larger than a radius of curvature in a second direction, perpendicular to the first direction. The concave surface is provided with two electrodes that are aligned in the first direction. An inclination of an object is measured by mounting the inclination sensor to the object and electrically detecting the position of the bubble as it contacts the concave surface, by passing a current through the liquid.

18 Claims, 5 Drawing Sheets

INCLINATION SENSOR

BACKGROUND OF THE INVENTION

The present invention relates to an inclination sensor which detects the inclination angle of an object on which the sensor is placed.

An inclination sensor may be used in various objects such as in measuring devices, cars, and planes for detecting the inclination angle thereof. A conventional inclination sensor includes a container in which a liquid and a gas Are sealed such that the gas forms a bubble floating in the liquid. The inclination sensor is then arranged to electrically detect the position of the bubble and thereby detect the inclination of the object on which the inclination sensor is placed.

FIG. 1 shows an example of an inclination sensor as disclosed in Japanese Patent Laid-Open Publication No. HEI 7-146142. A container 65 includes a top plate 60, a bottom plate 62, and a cylindrical wall 61 between the top and bottom plates 60 and 62. A liquid L and a bubble B are sealed inside the container 65. A bottom surface of the top plate 60 is formed to provide a spherical concave surface.

A first top electrode 63a and a second top electrode 63b are attached to the top plate 60 and a bottom electrode 64 is attached to the bottom plate 62 in such a manner that the liquid L is in contact with the electrodes 63a, 63b, and 64. The first and second top electrodes 63a and 63b are attached to opposite sides (the left and right in FIG. 1) of the top plate 60, respectively, with a space therebetween.

The contact area of the liquid L with respect to the first top electrode 63a and the second top electrode 63b changes according to the inclination of the container 65 in a direction in which an inclination is to be measured (a measuring direction: shown by X in FIG. 1). Accordingly, when a voltage is applied to the electrodes 63a, 63b, and 64, a ratio of the current flow through the first top electrode 63a and the bottom electrode 64 to the current flow through the second top electrode 63b and the bottom electrode 64 varies according to the inclination of the container 65. Accordingly, the inclination of the container 65 may be detected by measuring the current flow.

However, since the bottom surface of the top plate 60 is a spherical concave surface, if the container 65 is inclined with respect to a direction perpendicular to the measuring direction, the bubble B may move toward and come in contact with the cylindrical wall 61, which would affect the detection of the inclination. Accordingly, it is necessary to keep the container 65 precisely level with respect to the direction perpendicular to the measuring direction in order to provide accurate measurement.

SUMMARY OF THE INVENTION

It is therefore an object of the invention to provide a inclination sensor which does not require a high degree of precision when mounting of the inclination sensor with respect to the direction perpendicular to the measuring direction.

According to an aspect of the invention, there is provided an inclination sensor that includes a container having a cavity in which a liquid and a gas are fulfilled such that the gas forms a bubble floating in the liquid. The container includes a concave surface defining a ceiling of the cavity. The concave surface includes first and second curvatures crossing the center of the concave surface, the second curvature being perpendicular to the first curvature. The inclination sensor further includes a measuring system for measuring the positional displacement of the bubble in the direction of the first curvature with respect to the center thereby to measure the inclination of the container in the direction of the first curvature. The radius of the second curvature is set to be smaller than the radius of the first curvature, in such a manner that the sensitivity of the movement of the bubble to the inclination of the container in the direction of the second curvature is less than the sensitivity of the movement of the bubble to the inclination of the container in the direction of the first curvature.

With the arrangement above, the inclination sensor is more sensitive to the inclination in the direction of the first curvature and less sensitive to the inclination in the direction of the second curvature. Thus, the allowable inclination of the inclination sensor in the direction of the second curvature is larger than the maximum measurable angle in the first curvature. Accordingly, it is not necessary to keep the inclination sensor in precisely level with respect to the second direction.

In a particular embodiment, the liquid is an electrolyte. In this case, the measuring system may include at least two top electrodes provided to the concave surface that are aligned in the first curvature, a base electrode provided to a bottom of the cavity, and a controller arranged to apply a voltage to the two top electrodes and the base electrode, to measure a current flow through one of the top electrodes and the bottom electrode and a current flow through the other of the top electrodes and the bottom electrode, and to calculate an inclination based on the current flows.

In this case, since the radius of the second curvature is relatively small, even if the inclination sensor is inclined somewhat in the direction of second curvature, the contact area between the liquid and the top electrodes will not change significantly, such that the relative current flows for a given inclination in the direction of the first curvature do not change significantly. Preferably, the concave surface may be a toroidal surface.

In another particular embodiment, the inclination includes a top member, a bottom member and a wall, inner surfaces of the top and bottom members and walls forming the cavity. In this case, the concave surface may be formed on the top member. Preferably, each of the top and bottom members may have a disk shape the wall may have a cylindrical shape. Further, a periphery of the concave surface may have a circular shape, so that the concave and the inner surface of the cylindrical wall join to form a smooth joint.

In yet another particular embodiment, the inclination sensor may further include a holder which supports the container. In a particular case of this embodiment, the holder may include a plurality of pillars for supporting the top member of the container in such a manner that there is a clearance between the bottom member and the holder. In particulars the pillars may have flange surfaces on which the top member is placed.

In a preferred arrangement, the holder may further include a mounting portion for mounting the holder to an object. Preferably, the mounting portion includes an adjusting arrangement for adjusting an inclination of the holder (that is, the inclination sensor) in the direction of the first curvature. In particular, the adjusting arrangement may include at least one through hole and at least one fixing screw inserted through the through hole, wherein a diameter of the at least one through hole is greater than a diameter of the at least one fixing screw. In this arrangement, the fixing screw may be loosened such that the position of the inclination sensor can be fine adjusted and then the fixing screw can be tightened again.

It is preferable that the inclination sensor includes a lid provided on the holder to cover and protect the container. Further, the top member may be formed of a transparent material to allow observation of the bubble during adjustment. Further, in each of the above embodiments, the inclination sensor may further include a display for displaying an inclination based on the calculation of the controller.

DETAILED DESCRIPTION OF THE PREFERRED EMBODIMENTS

Figure 1:
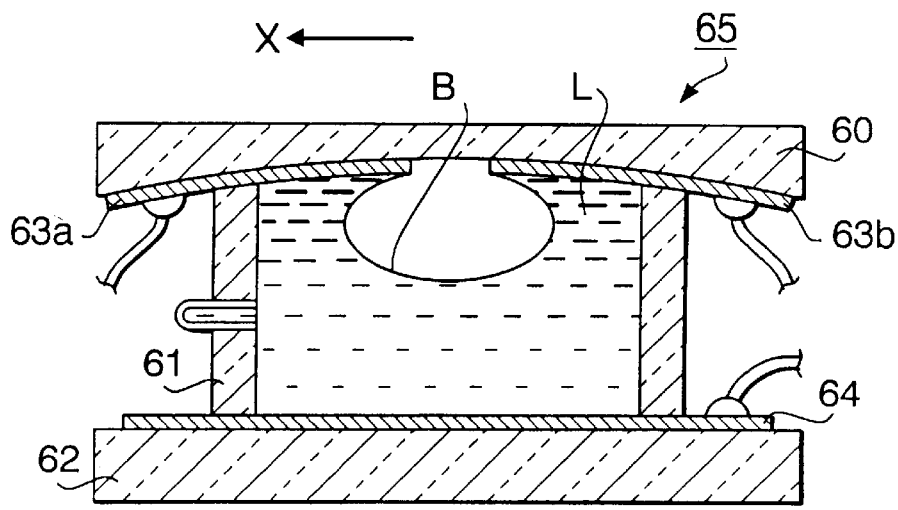
FIG. 1 is a cross section of a container of a conventional inclination sensor.
Figure 2:
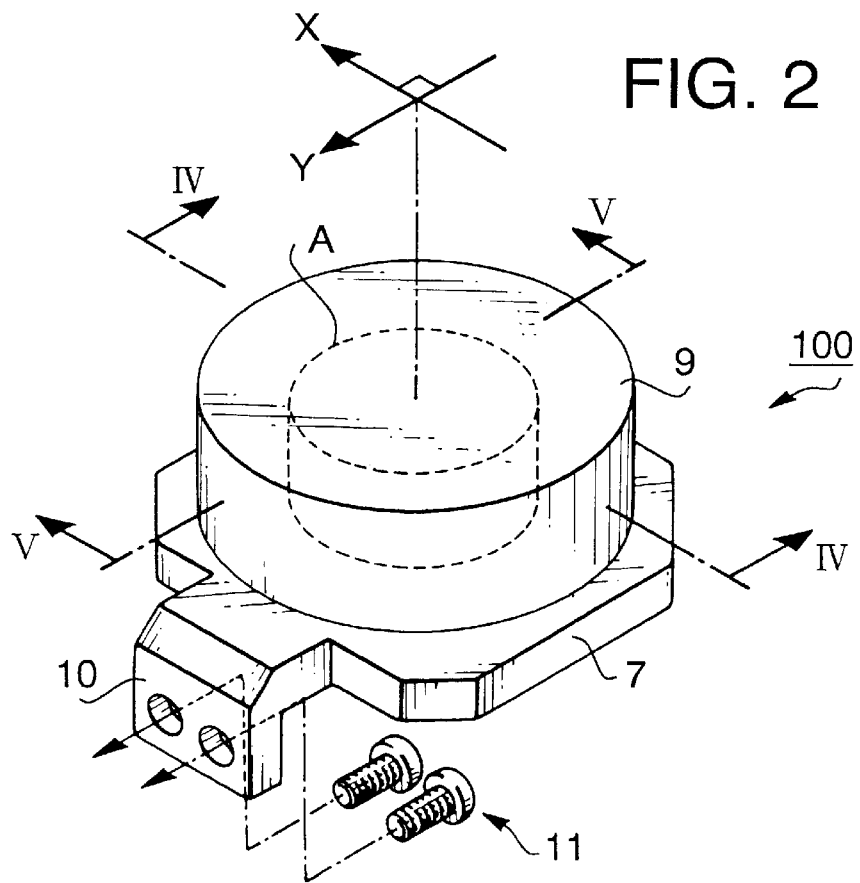
FIG. 2 is a perspective view of an inclination sensor according to an embodiment of the present invention.

FIG. 2 is a perspective view of an inclination sensor 100 according to an embodiment of the present invention. The inclination sensor 100 includes a holder 7, a container A (shown by a dotted line) mounted on the holder 7, and a lid 9 covering the container A. The holder 7 is provided with a mounting portion 10 for mounting the inclination sensor 100 to an object (not shown). As shown in FIG. 2, a direction in which the inclination is to be measured (that is, a measuring direction) is defined as an X-direction, and a direction perpendicular to the X-direction is defined as a Y-direction.

Figure 3:
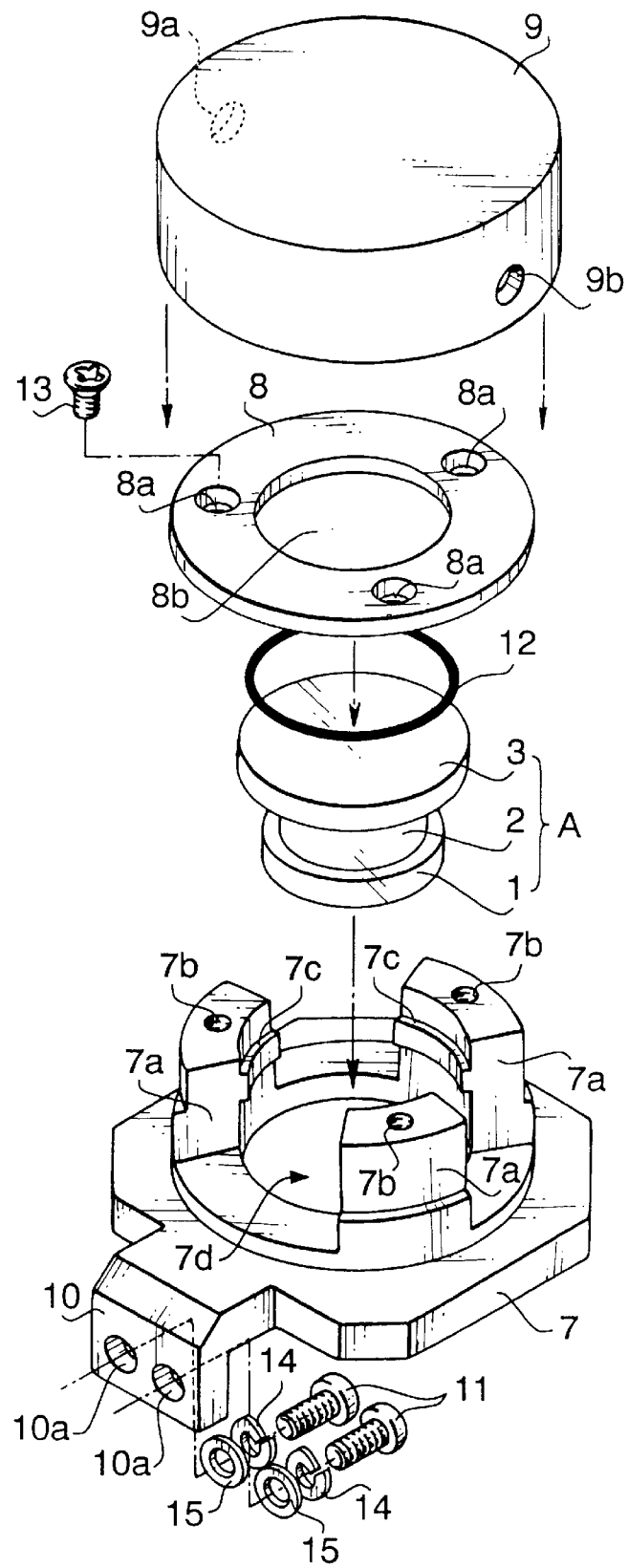
FIG. 3 is an exploded perspective view of the inclination sensor of FIG. 2.

FIG. 3 is an exploded perspective view of the inclination sensor 100. The container A includes a top plate 3, a bottom plate 1, and a cylindrical wall 2 between the top and bottom plates 3 and 1. The holder 7 is an aluminum plate having a polygonal shape (seen from above). The holder 7 includes a cylindrical bore 7d at the center thereof has a diameter that is the same as the outer diameter of the top plate 3. Three sector pillars 7a are provided around the circumference of the bore 7d. The inner surfaces of the sector pillars 7a are aligned with the inner surface of the bore 7d. A flange 7c is projected from the inner surface of each pillar 7a to provide a support for the top plate 3.

The mounting portion 10 is provided with two through holes 10a. The fixing screws 11 are inserted through the through holes 10a via washers 15 and spring washers 14, to mount the holder 7 to the object. The diameter of the through holes 10a is designed to be greater than the diameter of the fixing screws 11 such that, as described further below, the mounting position of the holder 7 can be adjusted in the X-direction by loosening the fixing screws 11.

The top plate 3, the bottom plate 1, and the cylindrical wall 2 are made of an insulating material such as lead glass. In a particular example, the diameter of the top plate 3 is set to 22 mm.

Figure 6:
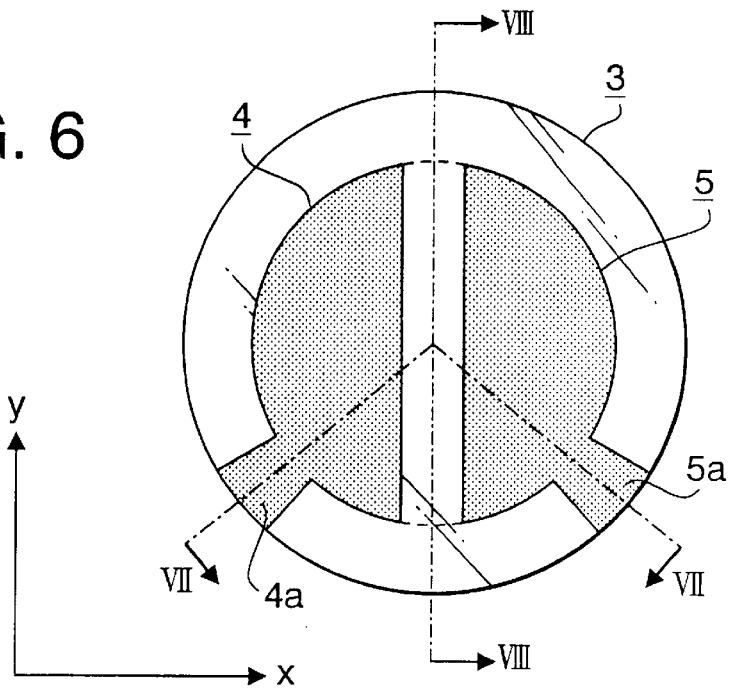
FIG. 6 is a bottom view of a top plate.
Figure 7:
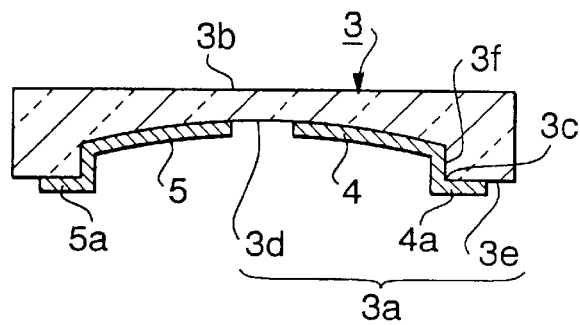
FIG. 7 is a sectional view of the top plate of FIG. 6 taken along a line VII—VII in FIG. 6.
Figure 8:
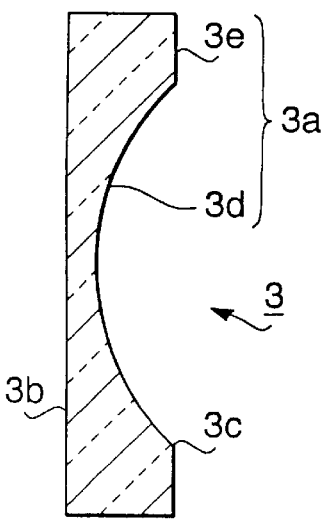
FIG. 8 is a sectional view of the top plate of FIG. 6 taken along a line VIII—VIII in FIG. 6.

FIG. 6 is a bottom view of the top plate 3. FIGS. 7 and 8 are sectional views taken along a line VII—VII and a line VIII—VIII in FIG. 6, respectively. As shown in FIGS. 7 and 8, the top plate 3 is a transparent disk having a flat top surface 3b and a bottom surface 3a. The bottom surface 3a is provided with a circular concave surface 3d and a flat surface 3e that surrounds a periphery 3c of the concave surface 3d. The concave surface 3d is formed as a toroidal surface in which the radiuses of curvature in the X-direction and in the Y-direction are different. The center of the curvatures in the X-direction and the Y-direction is the center of the bottom surface 3a.

Figure 9:
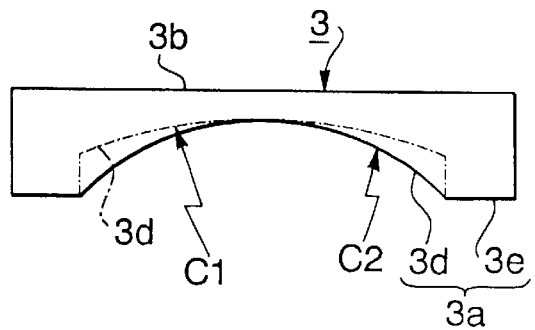
FIG. 9 is a view showing a curvature of the top plate in X-direction and in Y-direction.

FIG. 9 is a view in which the curvature in the X-direction (FIG. 7) is superimposed on the view of the Y-direction (FIG. 8). In this embodiment, a first curvature C1 in the X-direction has a relatively large radius, while a second curvature C2 in the Y-direction has a relatively small radius. As a particular example, the first curvature C1 in the X-direction has a radius of 300 mm and the second curvature C2 in the Y-direction has a radius of 60 mm.

As shown in FIGS. 7, 8, and 9, since the periphery 3c of the concave surface 3d is circular (in this example, having a diameter of 12.6 mm), the second curvature C2 extends to meet the flat surface 3e of the top plate 3, whereas the first curvature C1 extends to meet a ridge 3f formed between the first curvature C1 and the flat surface 3e of the top plate 3.

The top plate 3 is a glass mold, and the bottom surface 3a is roughened to a predetermined roughness using a #100 abrasive grain. As shown in FIG. 7, first and second top electrodes 4 and 5, of platinum film are deposited on the bottom surface 3a by high-frequency spattering. The first and second top electrodes 4 and 5 have a semicircular shape formed on the concave surface 3d, and are disposed symmetrically with respect to a center line extending in the Y-direction. The first and second top electrodes 4 and 5 have extending portions 4a and 5a that are formed over the ridge 3d and extend toward the periphery of the top plate 3 along the flat surface 3e thereof (as shown in FIG. 7).

Figure 4:
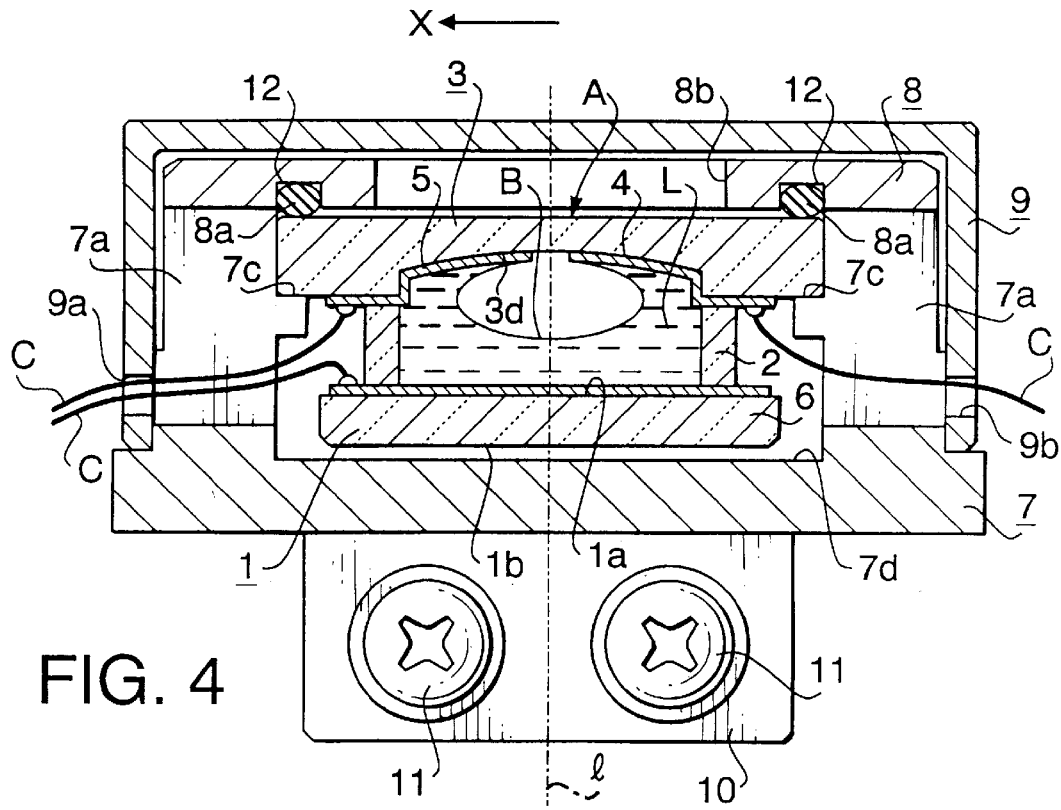
FIG. 4 is a cross section of the inclination sensor of FIG. 2 taken along a line IV—IV of FIG. 2;.
Figure 10:
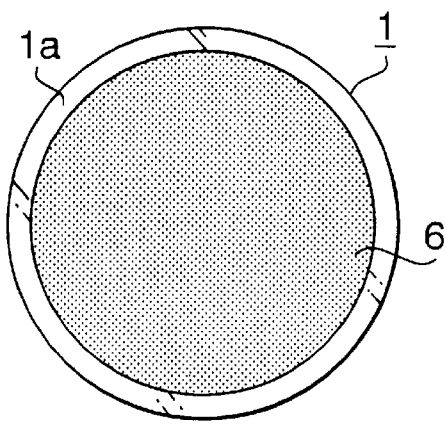
FIG. 10 is a top view of a bottom plate.

FIG. 10 is a plan view of the bottom plate 1. The bottom plate 1 is a transparent disk having a diameter of 19 mm and top and bottom surfaces 1a and 1b thereof parallel with each other (FIG. 4). The top surface 1a of the bottom plate 1 is roughened to a predetermined roughness using a #1000 abrasive grain. A bottom electrode 6 of platinum film is formed on the top surface 1a of the bottom plate 1 by using high-frequency spattering. The bottom electrode 6 is circular shaped. Its diameter is larger than the diameter of the cylindrical wall 2 and smaller than the diameter of the bottom plate 1.

The cylindrical wall 2 (FIG. 4) is made of glass having an outer diameter of 15 mm and an inner diameter of 12.6 mm. Top and bottom end surfaces of the cylindrical wall 2 are perpendicular to the axial direction thereof. The top and bottom plates 3 and 1 are attached to the cylindrical wall 2 such that the axes of the top and bottom plates 3 and 1 and the cylindrical wall 2 are coaxial with each other. In particular, the periphery 3c of the concave surface 3d of the top plate 3 is attached to the top end surface of the cylindrical wall 2, and the top surface 1a of the bottom plate 1 is attached to the bottom end surface of the cylindrical wall 2 using glass paste. Since the inner surface of the cylindrical wall 2 has the same diameter as the concave surface 3d of the bottom surface 3a (in this example, 12.6 mm), the concave surface 3d of the bottom surface 3a and the inner surface of the cylindrical wall 2 join to form a smooth joint.

As constructed above, the top and bottom plates 3 and 1 and the cylindrical wall 2 constitute the container A in which a liquid L and a predetermined amount of gas (to form a bubble B) are sealed. A supply port (not shown) is provided to the cylindrical wall 2 for supplying the liquid L and the gas into the container A. After the supply of the liquid L is completed, the supply port is closed using a heat seal. Two lead wires C are then soldered on the extending portions 4a and 5a of the top electrodes 4 and 5 and a third lead wire C is soldered on the periphery of the bottom electrode 6.

The liquid L is an electrolyte, such as a solution of potassium iodide dissolved in methyl-alcohol, which conducts current between the first top electrode 4 and the bottom electrode 6, and the second top electrode 5 and the bottom electrode 6.

When the container A is inclined in the X-direction. Similarly the bubble B moves in the X-direction, and when the container A is inclined in the Y-direction, the bubble B moves in the Y-direction. As described further below, if the inclination of the container A with respect to the Y-direction is less than a predetermined range, the bubble B does not contact the cylindrical wall 2, such that, when the container A is inclined in the X-direction, the bubble B still moves smoothly along the concave surface 3d in the X-direction.

As shown in FIG. 3, the container A is inserted into the bore 7d between the pillars 7a of the holder 7 from above. The top plate 3 is supported by the flanges 7c. The distance between the flange surface of the flange 7c and the bottom surface of the bore 7d is greater than the distance between the bottom surface 3a of the top plate 3 and the bottom surface 1a of the bottom plate 1. Accordingly, the container A is suspended by the flange 7c such that the top plate 3 is parallel with the holder 7.

Figure 5:
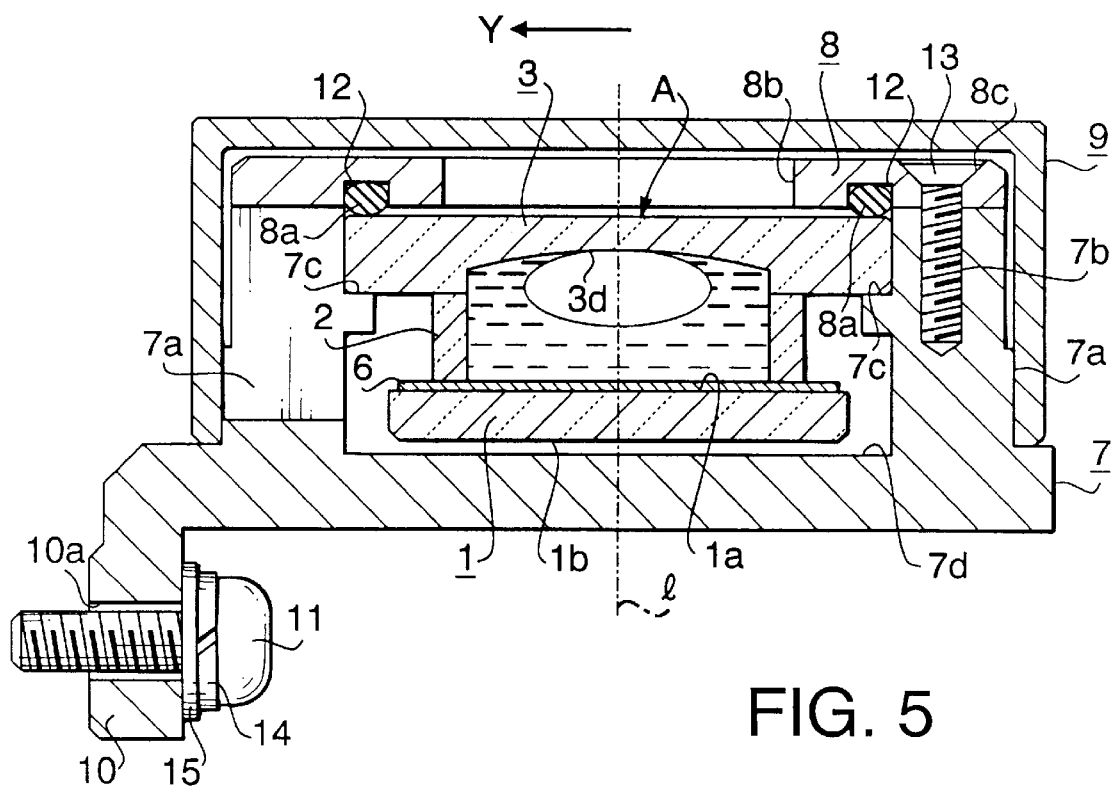
FIG. 5 is a cross section of the inclination sensor of FIG. 2 taken along a line V—V of FIG. 2.

An aluminum disc cover 8 is placed on the top surfaces of the pillars 7a. The cover 8 has three through holes 8a respectively aligned with the threaded holes 7b formed on the top surfaces of the pillars 7a. The through holes 8a are each tapered (as shown in FIG. 5) house a screw head of a flat head bolt 13. A circular groove 8a is formed on the bottom surface of the cover 8 (as shown in FIG. 4), into which an o-ring 12 is inserted to be placed between the cover 8 and the top plate 3. The cover 8 is further provided with a window Bb for observing the interior of the container A.

An aluminum lid 9 is provided to protect the container A from breaking and to prevent the entry of dust particles. The lid 9 is fit around an outer protrusion formed at the lower portion of the pillars 7a, such that there is a gap between the lid 9 and the upper portion of the pillars 7a. Further, the lid 9 is designed such that there is a gap between the lid 9 and the top of the cover 8. Accordingly, if the lid 9 is jarred or hit, the force is not transferred to the container A. The lid 9 is provided with two holes 9a and 9b through which lead wires C (described below) from the container A pass to the exterior.

Thus, the container A is supported by the holder 7 such a manner that the top plate 3 is parallel with the holder 7 and the top center portion of the concave surface 3d is at the highest position. The container A is positioned so that the X-direction (FIG. 6) is aligned in the direction in which the inclination is to be measured.

Figure 11:
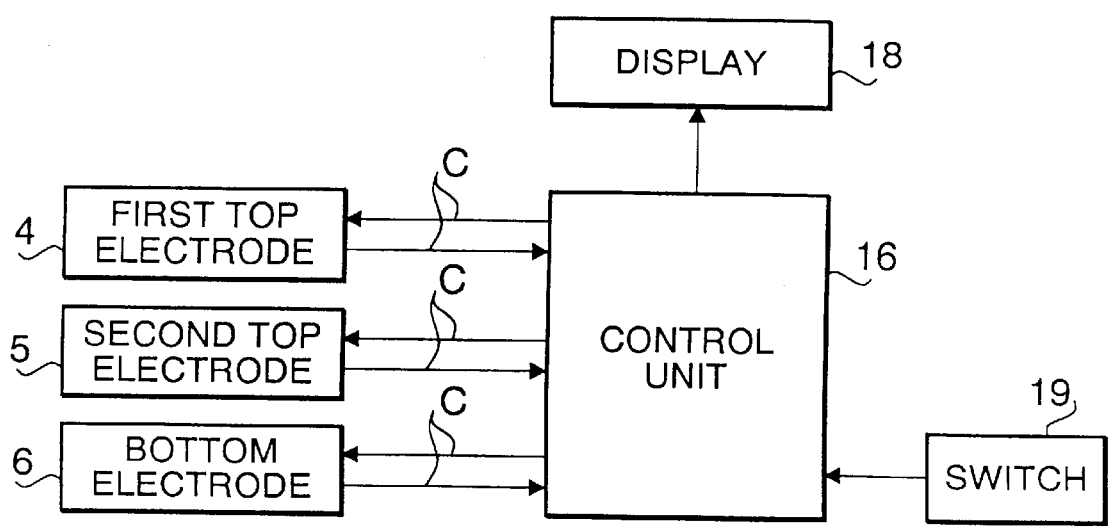
FIG. 11 is a block diagram illustrating a control structure of the inclination sensor.

FIG. 11 shows a block diagram of a control structure of the inclination sensor 100. A controller 16 is connected to the first top, second top, and bottom electrodes 4, 5 and 6 via the lead wires C. The controller 16 is further connected to a display 18 (such as an LCD Panel), for displaying the calculated inclination, and a main switch 19. When the main switch 19 is turned on, the controller 16 applies a voltage to the first and second top electrodes 4 and 5 and the bottom electrode 6. The controller 16 then measures the current flow through the first top electrode 4 and the bottom electrode 6 and the current flow through the second top electrode 5 and bottom electrode 6 to calculate the ratio thereof.

The resistance between the first top electrode 4 and the bottom electrode 6 changes according to the contacting area between the first top electrode 4 and the liquid L. Similarly, the resistance between the second top electrode 5 and the bottom electrode 6 changes according to the contacting area between the second top electrode 5 and the liquid L. If the container A is horizontal, the bubble B is at the top center of the concave surface 3d as shown in FIG. 4. Accordingly, the current flow through the first top electrode 4 and the bottom electrode 6 is the same as the current flow through the second top electrode 5 and the bottom electrode 6. If the container A is inclined, the bubble B moves to cover more of the first top electrode 4 or the second top electrode 5, which changes the contact area between the top electrode 4 and the liquid L and the contact area between the top electrode 5 and the liquid L. Accordingly, the ratio of the current flow through the first top electrode 4 and the bottom electrode 6 and the current flow through the second top electrode 5 and the bottom electrode 6 changes according to the inclination of the container A.

The controller 16 is arranged to determine the inclination angle of the container A by multiplying a predetermined constant by the above-mentioned ratio of current flow. The controller 16 is further arranged to repeatedly measure and determine the inclination of the container A and display the inclination on the display 18 as long as the switch 19 is turned ON.

In this embodiment, the concave surface 3d of the top plate 3 is so constructed that the radius of the first curvature C1 in the X-direction is relatively larger than the radius of the second curvature C2 in the Y-direction. Accordingly, the movement of the bubble B is more sensitive to the inclination in the X-direction (direction in which the inclination is to be measured) and less sensitive to the inclination in the Y-direction. Further, even if the inclination sensor 100 is inclined somewhat in the Y-direction, the bubble B does not reach the cylindrical wall 2, and the inclination sensor 100 continues to perform accurate measurements. Accordingly, it is not necessary to keep the inclination sensor in precisely level with respect to the Y-direction.

Although the concave surface 3d is a toroidal surface in this embodiment, it is possible to employ other shapes such that a radius of curvature at a center of the concave surface is larger in the X-direction than in the Y-direction The operation of the inclination sensor 100 is now described with respect to FIGS. 3 and 4.

First, the inclination sensor 100 is fixed to the object (not shown) by fixing screws 11 (FIG. 3) such that the X-direction of the inclination sensor 100 is aligned with the measuring direction. As shown in FIG. 3, since the through holes 10a and 10b of the mounting portion 10 are larger than the fixing screws 11, the position of the inclination sensor 100 can be fine aligned by loosening the fixing screws 11 and moving the fixing screws 11 relative to the through holes 10a and 10b. This adjustment is preferably performed while observing the bubble B through the cover 8, and continues until the bubble B is centered between the first and second top electrodes 4 and 5. After the adjustment, the fixing screws 11 are tightened and the lid 9 is placed on the holder 7. The lead wires C are fed through the lid 9 and are connected to the controller 16. After the mounting of the inclination sensor 1 is completed, the main switch 19 is turned ON. The controller 16 then applies the voltage to the first and second top electrodes 4 and 5 and the bottom electrode 6 and measures the current flow through the first top electrode 4 and the bottom electrode 6 and the current flow through the second top electrodes 5 and the bottom electrode 6 to determine the inclination.

The present disclosure relates to subject matter contained in Japanese Patent Application No. HEI 08-105834, filed on Apr. 25, 1996, which is expressly incorporated herein by reference in its entirety.

What is claimed is:

1. An inclination sensor comprising:
   a container having a cavity holding a liquid and a gas such that said gas forms a bubble floating in said liquid, said container having a concave surface defining a ceiling of said cavity, said concave surface having substantially uniform first and second radii of curvature crossing a center of said concave surface, said second radius of curvature being perpendicular to said first radius of curvature;
   a measuring system for measuring a positional displacement of said bubble in the direction of said first radius of curvature with respect to said center to measure the inclination of said container in the direction of said first radius of curvature;
   said second radius of curvature being smaller than said first radius of curvature,
   wherein said bubble is less sensitive to an inclination of said container in the direction of said second radius of curvature than to an inclination of said container in the direction of said first radius of curvature; and
   said container having a bottom member, a side wall, and a top member having said concave surface such that said concave surface extends directly from a cylindrical plane defined by said side wall.

2. The inclination sensor according to claim 1, wherein said concave surface is a toroidal surface.

3. The inclination sensor according to claim 1, wherein said liquid is an electrolyte and said measuring system comprises:
   at least two top electrodes provided on said concave surface, said two top electrodes being aligned with said first radius of curvature;
   a base electrode provided to a bottom of said cavity of said container; and
   a controller which applies a voltage to said at least two top electrodes, and said base electrode, measures a first current flow through one of said at least two top electrodes and said bottom electrode, measures a second current flow through another of said at least two top electrodes and said bottom electrode, and calculates an inclination of said container based on said first and second current flows.

4. The inclination sensor according to claim 3, wherein each of said top and bottom members is substantially disk shaped and said wall is substantially cylindrically shaped.

5. The inclination sensor according to claim 4, wherein a periphery of said concave surface is substantially circularly shaped.

6. The inclination sensor according to claim 1, further comprising a holder which supports said container.

7. The inclination sensor according to claim 6, said holder comprising a plurality of pillars for supporting said top member of said container, in such a manner that there is a clearance between said bottom member and said holder.

8. The inclination sensor according to claim 6, wherein said pillars have flange surfaces on which said top member rests.

9. The inclination sensor according to claim 6, said holder further comprising a mounting portion which mounts said holder to an object.

10. The inclination sensor according to claim 9, said mounting portion being adjustable for adjusting an inclination of said inclination sensor in the direction of said first curvature.

11. The inclination sensor according to claim 10, said mounting portion including at least one through hole and at least one fixing screw extending through said through hole, wherein a diameter of said at least one through hole is greater than a diameter of said at least one fixing screw.

12. The inclination sensor according to claim 6, further comprising a lid provided on said holder for covering said container.

13. The inclination sensor according to claim 1, wherein said top member is a transparent material.

14. The inclination sensor according to claim 3, further comprising a display for displaying an inclination based on a calculation of said controller.

15. An inclination sensor comprising:
   a container having a cavity in which an electrolyte liquid and a gas are suspended such that said gas forms a bubble floating in said liquid, said container comprising a concave surface defining a ceiling of said cavity, said concave surface extending directly from a cylindrical plane defined by a side wall of said cavity, said concave surface including substantially uniform first and second radii of curvature crossing the center of said concave surface, said radius of second curvature being perpendicular to said radius of first curvature;
   at least two top electrodes provided on said concave surface, said two top electrodes being aligned with said first radius of curvature;
   a base electrode provided on a bottom of said cavity of said container; and
   a controller which applies a voltage to said at least two top electrodes, and said base electrode, measures a first current flow through one of said at least two top electrodes and said bottom electrode measures a second current flow through another of said top at least two electrodes and said bottom electrode, and calculates an inclination of said container in the direction of said first radius of curvature, based on said first and second current flows;
   wherein said concave surface is a toroidal surface in which said second radius of curvature is smaller than said first radius of curvature.

16. An inclination sensor comprising:
   a container having a cavity in which a liquid and a gas are suspended such that said gas forms a bubble floating in said liquid, said container comprising a concave surface defining a ceiling of said cavity, said concave surface extending directly from a cylindrical plane defined by a side wall of said cavity, said concave surface including substantially uniform first and second radii of curvature crossing the center of said concave surface, said second radius of curvature being perpendicular to said radius of first curvature;
   a holder which supports said container and can be attached to an object; and
   said second radius of curvature being smaller than said first radius of curvature, such that movement of said bubble is less sensitive to an inclination of said container in the direction of said second radius of curvature than to an inclination of said container in the direction of said first radius of curvature.

17. The inclination sensor according to claim 16, wherein said concave surface is a toroidal surface.

18. The inclination sensor according to claim 16, said holder being adjustable to adjust inclination of said inclination sensor in the direction of said first curvature.

* * * * *